Jan. 21, 1969
G. A. PROFITA
3,422,517
METHOD OF WELDING
Filed Oct. 20, 1965
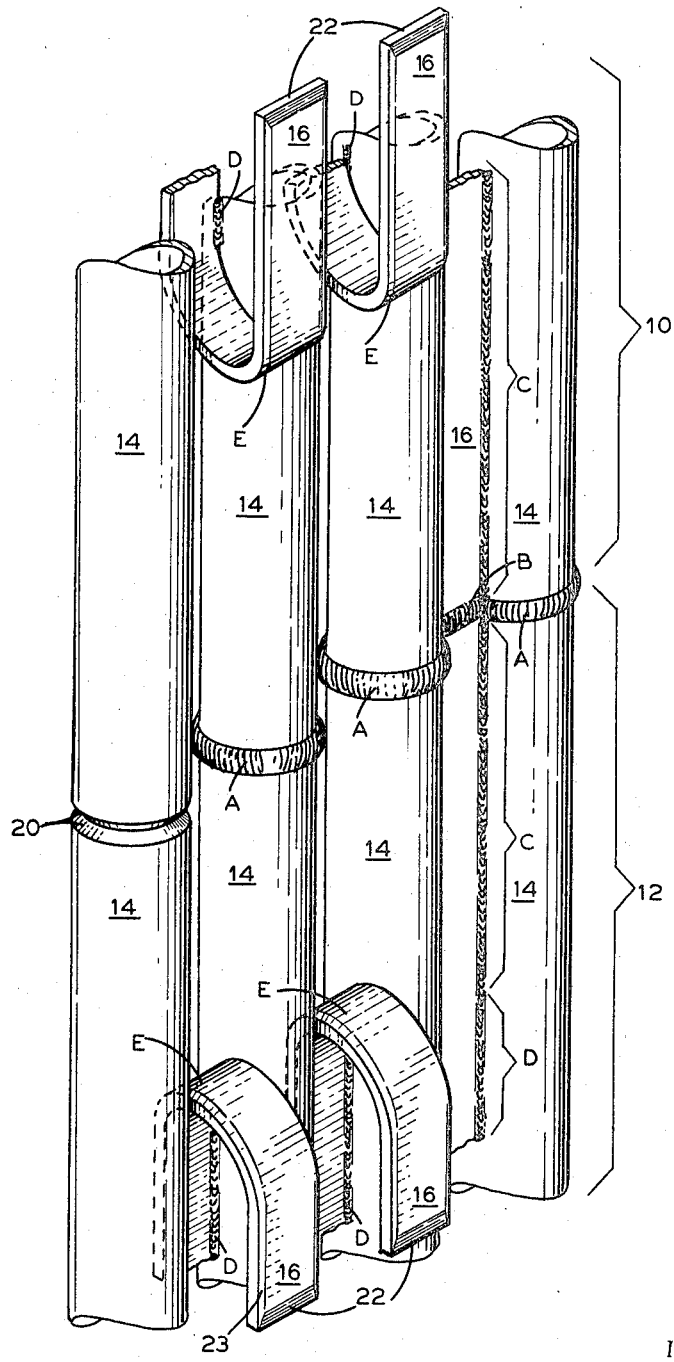
INVENTOR.
Gerald A. Profita
BY
*J.P.Moran*
ATTORNEY

United States Patent Office 3,422,517
Patented Jan. 21, 1969

3,422,517
METHOD OF WELDING
Gerald A. Profita, Doylestown, Ohio, assignor to The Babcock & Wilcox Company, New York, N.Y., a corporation of New Jersey
Filed Oct. 20, 1965, Ser. No. 498,228
U.S. Cl. 29—157.4                5 Claims
Int. Cl. B21d 53/00

ABSTRACT OF THE DISCLOSURE

A method of butt welding tubulous furnace wall panels comprising a plurality of tubes and webs welded to one another so that the tubes are spaced from one another and a web fills the space between the neighboring pairs of tubes. The tubes and webs are joined to one another by welding a portion of the length of each web to its adjoining tubes, and bending the remaining portion of each web out of the plane of the panels to provide ready access to the adjoining tube ends for welding them to a similar panel section.

Background and summary of the invention

When furnace walls are larger than fabrication and shipping capabilities they are prefabricated in panel sections for assembly by welding at the construction site. The panels comprise spaced, parallel tubes with a web or membrane welded between each pair of tubes, and it is a problem to prefabricate the panels so that they can be easily and effectively welded together to form a gas-tight wall with the abutting tubes capable of conducting fluid at high temperature and pressure. The problem solved by the present invention, therefore, is to provide a more efficiently weldable panel and an improved method of butt welding the same.

According to the present invention, coextensive tubes and membranes are shop welded together in planar panel sections, except for a short end portion of the membrane. For example, up to 10 inches or more at the end of the membrane is left unwelded to the tubes and bent out of the plane of the panel in order to provide access to the tube ends. The bending of the unwelded ends of the membranes out of the plane of the wall can be performed at any time prior to welding the tube ends, but preferably in the shop, prior to shipment to the erection site.

In forming the furnace wall tube ends of adjoining tube panels are placed in abutting relationship; and abutting tube ends are aligned and then welded together by a continuous circumferential weld. Next, the bent, unwelded ends of the membranes are restored to their original position in the plane of the wall and they are then welded to their adjoining tubes and also to one another, end to end, in order to close the gap between tubes.

The present method is believed to be better than one prior method, where the end portions of membranes are omitted and later inserted and welded in position after the tubes have been butt welded, because the finished joint has a neater appearance and also because it is not necessary to handle and fit inserts in closing the gap in the wall. The present method is also believed to be better than another prior method, where membranes and tubes are fully welded in the prefabricated panels and the panels are butt welded by a continuous weld across both sides of the junction between abutting panels, because of the greater ease with which slight misalignment of tubes can be corrected when tubes are not restrained by a constricting membrane welded thereto for its entire length.

Various other objects, features, and advantages of the invention will appear more fully from the detailed description which follows, taken in connection with the accompanying drawings forming a part of the present applacation.

Brief description of the drawing

The figure is a fragmentary perspective view of adjoining tube panels showing the butt weld in various stages of completion, proceeding from left to right.

Description of the preferred embodiments

Shown in the drawing as a portion of a rigid, gas impervious, pressure resistant furnace wall are fragments of upper and lower tubulous panels 10 and 12, each comprising a series of aligned, vertically elongated metal tubes 14 in spaced and parallel relationship, with a metal web or membrane 16 filling the space between each pair of neighboring tubes. Steel is the metal of choice. Since these are important economic advantages in shop assembly, it is practicable to shop weld the tubes 14 and membranes 16 into the largest panels capable of shipment so that during erection it is only necessary to weld these panels, e.g. panels 10 and 12, together. The field welded portions of the panels 10 and 12 may then be stress relieved.

An important step in the construction procedure is the alignment of abutting tube ends portions of adjoining panels so that there will be a continuously smooth fluid flow path established between corresponding tubes of adjoining panels.

The ends of the tubes 14 may be beveled, as at 20 to ensure that a full penetration butt weld is obtained at the tube ends. The ends of the membranes 16 may also be beveled, as at 22; and the sides of the membranes 16 may also be beveled, as at 23.

The finally assembled and welded panels 10 and 12 of the present invention have circumferential welds A at the junctions of abutting tube ends, and also welds B between abutting ends of the membranes 16. There is also a weld C joining the side edges of the end portion E of each membrane 16 to its adjoining tubes 14. Welds B and C are preferably performed on both sides, e.g. back and front, of the panels 10 and 12.

According to the present invention, tube panels are prepared in the shop for shipment to the field by arranging the tubes parallel to one another and with a uniform, predetermined space between them. Each space between neighboring tubes 14 is filled by a metallic membrane 16 which is of generally rectangular cross section, but preferably of the cross-sectional shape shown in FIG. 19 of U.S. Patent No. 2,993,983. The intermediate portion, that is, all but the end portions E of the membranes 16 are then welded to the tubes by a weld D between the side edge of each membrane 16 and the outer surface of its adjoining tube 14, preferably on both sides of the panel.

Although the welds D, partially shown in the drawing, are short because of the fragmentary nature of this illustration, it will be appreciated that in actual practice such welds extend for 80 to 90% or more of the length of the tubes 14.

In tube panels 10 and 12 made up of tubes 14 having an outside diameter of 1½ inches or less, the membranes 16 are usually made of shaped steel bar stock up to ⅝ inch wide, in which case it is preferred that the unwelded end portions E of the membranes 16 be from 5 to 8 inches in length. For tubes 14 larger than 1½ inches in outside diameter, and with membranes wider than ⅝ inch, it is preferred that the unwelded end portions E be 10 to 12 inches long. It is preferred that each panel be cut to length along a plane that is normal to the tube axes. Since the membranes 16 extend for the entire length of the tubes 14, the cutting plane extends through both tubes 14 and membranes 16 so that after the cutting operation they will be coextensive, with their ends lying in a common plane. Next, the unwelded end portion E of each membrane 16 is reversely bent 180° out of the plane of the panel. Prior to shipment, the longitudinal welds D which join the tubes 14 and the intermediate portions of the membranes 16 are stress relieved in the shop so that the tubes 14 will have their full strength quality. Panels 10 and 12 thus made are shipped to the construction site.

At the construction site, the panels 10 and 12 are assembled with the beveled ends of the adjoining tubes 14 in abutting relationship, or they are very closely spaced, e.g. 1/16 inch. Prior to initiation of welding, all of the ends E of the membrane 16 will remain reversely bent out of the plane of the tube panels 10 and 12, thereby providing free access to the tube ends 20 and permitting any necessary correction for slight misalignment as the welding of successive tubes proceeds, as from left to right across the entire width of the proposed junction between the panels.

The method of butt welding adjoining panels, according to the present invention, thus involves the following steps:

(a) Assembling adjoining panels 10 and 12 with their corresponding tube ends in substantially abutting relationship.

(b) Aligning and then circumferentially welding abutting tube ends.

(c) Inspecting the quality of all circumferential welds A and rewelding as necessary.

(d) Bending the previously unwelded end portions E of the membranes 16 back into the plane of the panels 10 and 12 so that the ends of adjoining membranes are in abutting or very closely spaced relationship.

(e) Welding the end portions E of the membranes 16 to the tubes 14 by weld C, and to one another by weld B, thereby closing the wall and thereby making a gas-tight tubulous wall structure.

The welding performed in the field to produce welds A, B and C can be performed in any suitable manner, with or without semi-automatic welding apparatus. So-called short arc welding apparatus is preferred to conventional hand held, stick electrode equipment, however, because it is uniformly effective, dependable and more efficient.

From the foregoing it can be seen the the concept of bending an end portion of the membrane 16 out of the plane of the wall provides ready access to the tube ends at the junction of the panels for convenience in correcting misalignment and for making continuous circumferential welds, the membrane being subsequently returned to planar position and welded to the contiguous tube exteriors for sealing the wall. With no increase in material cost, the handling, preparing, and welding of separate, special inserts to seal the wall after welding the tube ends is eliminated, and the time and cost of the field welding procedure is greatly reduced.

Although the invention has been shown in but one form, it will be obvious to those skilled in the art that it is not so limited, but that it is susceptible of various changes and modifications without departing from the spirit thereof as set forth in the appended claims.

An embodiment of the invention may be described as a panel section of a tubulous furnace wall prepared for welding to a similar panel section, comprising a plurality of elongated metal tubes arranged in parallel and spaced relationship, a metal membrane for each of the spaces between said tubes being coextensive therewith and welded thereto in said spaces except at the end portions thereof, said end portions being bent out of the plane of said panel section in order to provide free access for welding the ends of said tubes and being bendable back into the plane of said panel section for welding to the adjacent end portions of said tubes after the ends of said tube have been welded.

What is claimed is:

1. A method of butt welding adjoining tube panels of spaced parallel tubes having coextensive webs filling the spaced between the adjoining tubes and being welded thereto, comprising:
    (a) providing each web with an unwelded end portion,
    (b) bending the unwelded end portion of each web out of its position between adjoining tubes,
    (c) butt welding the tube ends to those of the adjoining panel at their corresponding ends,
    (d) bending the unwelded end portions of said webs back into position between said tubes, and
    (e) welding the end portions of the webs to their adjoining tubes and to those of the adjoining panel at their corresponding ends.

2. An improved method of butt welding adjoining tube panels of spaced tubes having coextensive membranes welded to adjoining tubes, comprising:
    (a) providing each membrane with an unwelded end portion extending into the weld zone between panels,
    (b) bending the unwelded end portion of each membrane out of the weld zone,
    (c) positioning corresponding tube ends of the respective panels in aligned and substantially abutting relationship,
    (d) welding said abutting tube ends,
    (e) bending the unwelded end portions of said membranes back into the weld zone, and
    (f) welding the end portions of the membranes to their adjoining tubes and to one another.

3. The method according to claim 2 wherein said welding is performed circumferentially about the junction of abutting tube ends.

4. An improved method of butt welding adjoining tube panels, wherein each panel comprises a plurality of parallel and spaced tubes with a membrane welded in place between adjoining tubes of each panel, the ends of the tubes and membranes being in coextensive and substantially coplanar relationship, comprising:
    (a) providing each membrane with an unwelded free end portion which is coextensive with said tubes,
    (b) bending the free end portion of each membrane out of the plane of each tube panel to provide access to the tube ends,
    (c) positioning said tube panels for welding with corresponding ends of their respective tubes in substantially abutting relationship,
    (d) welding abutting tube ends of the respective panels,
    (e) bending the free end portions of the membranes back into the plane of the panels, and
    (f) welding the free ends of the membranes to their associated tubes and to one another.

5. The method according to claim 3 including the step of aligning abutting tube ends prior to welding them, and wherein said welding is performed continuously in a circumferential path at each junction of abutting tube ends.

References Cited

UNITED STATES PATENTS 3,154,666  10/1964  Lorenz _____ 219—137

RICHARD M. WOOD, *Primary Examiner.*

J. GREGORY SMITH, *Assistant Examiner.*

U.S. Cl. X.R.

29—480, 472.1; 219—137